US012789198B1

(12) United States Patent
Adams et al.

(10) Patent No.: US 12,789,198 B1
(45) Date of Patent: Nov. 10, 2026

(54) FLUIDIC SEPARATOR FOR REFINEMENT OF SHREDDER RESIDUE

(71) Applicant: SA Recycling LLC, Orange, CA (US)

(72) Inventors: George Adams, Fort Lauderdale, FL (US); Mike Adams, Anaheim, CA (US); Alex Meza, Chino, CA (US); Clifford Newby, Orange, CA (US)

(73) Assignee: SA RECYCLING LLC, Orange, CA (US)

( * ) Notice: Subject to any disclaimer, the term of this patent is extended or adjusted under 35 U.S.C. 154(b) by 0 days.

(21) Appl. No.: 19/548,379

(22) Filed: Feb. 24, 2026

(51) Int. Cl.
*B03B 9/06* (2006.01)
*B03B 5/52* (2006.01)
*B03C 1/10* (2006.01)
*B03C 1/30* (2006.01)

(52) U.S. Cl.
CPC ................ *B03B 9/061* (2013.01); *B03B 5/52* (2013.01); *B03C 1/10* (2013.01); *B03C 1/30* (2013.01); *B03C 2201/20* (2013.01)

(58) Field of Classification Search
CPC .. B03B 5/52; B03B 9/061; B03C 1/10; B03C 1/30; B03C 2201/20
See application file for complete search history.

(56) References Cited

U.S. PATENT DOCUMENTS 1,543,534 A 6/1925 Ullrich
3,168,464 A 2/1965 Ferris et al.
3,489,280 A 1/1970 Israelson et al.
4,693,812 A 9/1987 Bond et al.
4,851,129 A 7/1989 Griffiths et al.
7,886,913 B1 2/2011 Fritz et al.
8,056,728 B2 11/2011 Riise et al.
9,242,251 B2 1/2016 Reaves et al.
(Continued)

FOREIGN PATENT DOCUMENTS

AU 2020201679 B2 3/2020

OTHER PUBLICATIONS

Eriez Manufacturing Co., "Wet Drum Separators Heavy Media and Concentration Models" MMPB-470O, 2016, 8 pages.

*Primary Examiner* — Michael Mccullough
*Assistant Examiner* — Kalyanavenkateshware Kumar
(74) *Attorney, Agent, or Firm* — SoCal IP Law Group LLP; Steven Sereboff

(57) ABSTRACT

There is disclosed a fluidic separation system for separating magnetically and non-magnetically responsive material from shredder residue. The system includes a magnetic drum having at least one flow assist member, a separator chamber for mixing shredder residue with fluid to support stratification, and a cascade trough. The drum attracts magnetically responsive material from the shredder residue and transports it to a first chute having a first auger, while non-magnetically responsive material is guided downward into a second chute having a second auger. The cascade trough directs fluid over the drum's exterior, creating a shear effect that aids the discharge of magnetically responsive material into the first chute. The first and second chutes are spatially separated and positioned to receive respectively discharged material. The first and second augers are supported by accumulated material along each chute bottom. Each chute includes an exit weir for removing floating waste and regulating fluid levels.

18 Claims, 7 Drawing Sheets

(56) References Cited

U.S. PATENT DOCUMENTS

| | | | | |
|---|---|---|---|---|
| 9,339,848 | B2 | 5/2016 | Berkhout et al. | |
| 9,566,587 | B2 | 2/2017 | Warkentin et al. | |
| 9,592,515 | B1 * | 3/2017 | Adams | B03B 5/38 |
| 2019/0168235 | A1 * | 6/2019 | Valerio | B03B 5/56 |
| 2022/0097079 | A1 | 3/2022 | Valerio | |

* cited by examiner

FLUIDIC SEPARATOR FOR REFINEMENT OF SHREDDER RESIDUE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to separating magnetically and non-magnetically responsive material from shredder residue.

Description of the Related Art

The recycling and material recovery industries increasingly rely on industrial shredding and separation processes to recover valuable materials from mixed-material objects and waste streams. Such objects may include automobiles, appliances, industrial machinery, consumer products, electronic waste, construction debris, and other complex articles that contain combinations of magnetically and non-magnetically responsive materials. After shredding, these materials form a heterogeneous mixture commonly referred to as automotive shredder residue ("ASR").

Typical systems for recovering larger and denser metallic fractions commonly generate residual waste streams that remain after primary and secondary separation stages. These residual streams may include fine and ultra-fine particulate material, composite fragments, weakly magnetic particles, and metal-bearing particulates that are not fully recovered using conventional gravity-based, screening, or bulk magnetic separation techniques. Such residual particulates may remain suspended in a wet or slurry environment or entrained in damp waste fractions and may still contain recoverable magnetically and non-magnetically responsive materials.

Conventional handling of these residual waste streams often involves dewatering and disposal, secondary low-resolution processing, or landfill placement, which can result in loss of recoverable value and increased environmental and economic costs. Accordingly, there exists a need for improved systems and methods capable of further refining residual shredder residue particulates, particularly in wet processing environments, to enhance recovery of remaining magnetically and non-magnetically responsive materials.

DETAILED DESCRIPTION

Figure 1:
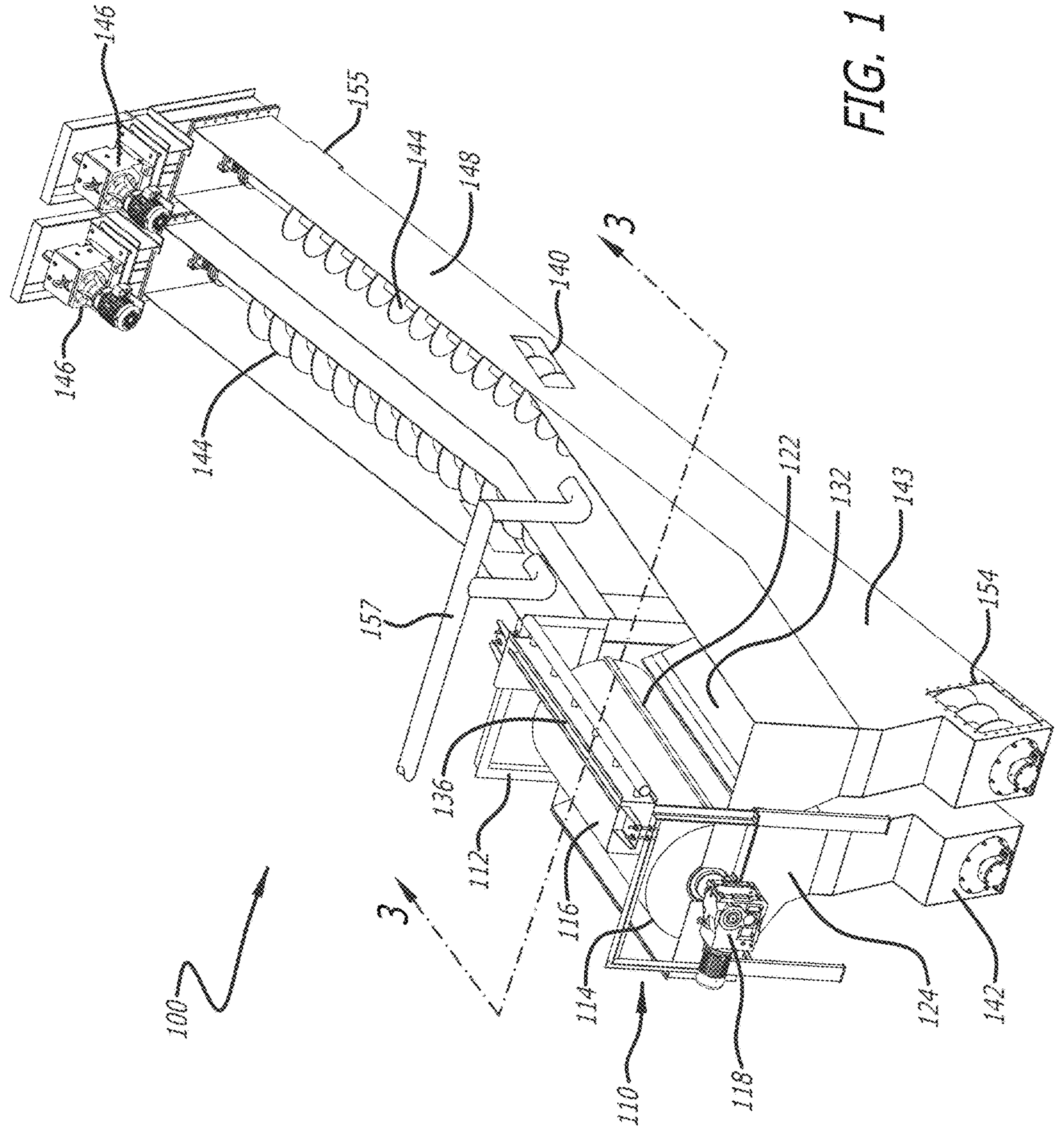
FIG. 1 is a front perspective view of a fluidic separation system.

A fluidic separation system is described for separating magnetically and non-magnetically responsive materials from shredder residue that may be received from an industrial shredder or other systems and methods for producing shredder residue. Shredder residue may comprise a heterogeneous mixture of individual, solid pieces having varying shape, size, mass, specific gravity, composition, density, and color. Variations may occur among different pieces and within individual pieces. Shredder residue pieces may have irregular or regular external shapes, varying surface areas, and sizes ranging from coarse fragments to fine or microscopic particulates.

Shredder residue as used herein is further characterized as three-quarters-inch minus, such that the particulate material making up the shredder residue includes particles having a maximum dimension of approximately 19 mm (¾ inch), and including fines down to approximately sub-millimeter or dust-sized particles. The term fines refers to particulate material having sufficiently small particle size such that the particles tend to remain suspended or float to the top of a process fluid under operating conditions of the separation system. Some particulate materials may be compact with relatively uniform dimensions while others may be elongated, planar, fibrous, or composite in form. The shredder residue also comprises magnetically responsive material and non-magnetically responsive material, including ferrous metals, non-ferrous metals (e.g., copper, aluminum), metal alloys, glass, ceramics, fibers, rubber, liquids, plastics, composites, electronic components, coatings and dirt or mineral matter. The character of shredder residue in any given load depends greatly on the type of materials or objects being processed.

The sizes, shapes, compositions and densities of the various shredder residue pieces influence the process of separating heavier from lighter pieces and magnetic from non-magnetic pieces. Accordingly, any given load of shredder residue may exhibit characteristics that differ from other loads, such as a predominance of lighter materials, finer particle sizes, composite materials or, conversely, a greater proportion of large or dense metallic pieces. The character of the shredder residue affects the rate, efficiency and effectiveness of separation processes, which may be accommodated by adjusting fluid flow ratios, fluid velocities, separator system configurations, and material throughput rates. Knowledge of the shredder residue characteristics may therefore be used to establish optimized operating conditions that promote stratification and sedimentation of materials, suspend fines as appropriate and maximize throughput and material separation and recovery.

Shredder residue entering the fluidic separation system may be introduced in a wet or fluidized condition referred to as slurry. The fluidic separation system introduces a process fluid, which may include water, recycled process water, aqueous solutions, or other fluidic media suitable for stratification of the shredder residue and enabling separation of non-magnetically and magnetically responsive material. Stratification refers to the separation of materials into distinct layers based on their physical properties, here magnetically and non-magnetically responsive materials. The fluidic separation system may receive dry or nearly dry shredder residue from the source and combine it with the process fluid to form a slurry prior to or during engagement of separation process. The introduction of the process fluid facilitates hydraulic transport, promotes controlled flow behavior and enhances subsequent separation of magnetic and non-magnetic fractions.

Shredder residue introduced to the fluidic separation system in a pre-separation condition has a relatively high concentration of process fluid and comprises a heterogenous mixture of magnetically and non-magnetically responsive material. Magnetically and non-magnetically responsive material exiting the fluidic separation system, post-separation is characterized as non-magnetic fraction and magnetic fraction. A fraction refers to a portion, subset or stream of material that has been separated or classified from a larger mixture based on one or more physical or chemical properties, such as magnetic responsiveness, density, size, shape or composition.

Non-magnetic fraction exits the fluidic separation system substantially drier than the inlet shredder residue having a concentration of non-magnetically responsive material. The non-magnetic fraction may include non-ferrous metallic particles, such as copper, aluminum, brass and associated alloys, including small wire fragments and metallic flakes, and non-metallic particulates, including glass fragments, mineral aggregates, plastics, rubber, insulation fibers and dirt consistent with shredder residue that has undergone separation by magnetic response. Relative to the inlet shredder residue, the non-magnetic fraction may have residual surface wetness, as a substantial portion of the process fluid has been removed during the final conveyance and discharge of the fraction. The non-magnetic fraction may be further refined by additional processing including screening, density-based classification, eddy current separation, secondary magnetic separation or other downstream refinement processes.

Magnetic fraction also exits the fluidic separation system substantially drier than the inlet shredder residue having a concentration of magnetically responsive materials. The magnetic fraction many include ferrous fragments and iron-containing alloys, including fine wire-like pieces and small metallic fragments and residual non-magnetic particulates, including dirt, mineral fines, small plastic fragments, insulation fibers and other entrained debris that remains adhered to or intermixed with the magnetic fraction. Relative to the inlet shredder residue, the magnetic fraction may have residual surface wetness, as a substantial portion of the process fluid has been removed during the final conveyance and discharge of the fraction. The magnetic fraction remains heterogeneous in shape and composition, including irregular compacted clusters of fines and elongated metallic strands, consistent with shredder residue that has undergone separation by magnetic response. The magnetic fraction may be further refined by additional processing including screening, density-based classification, eddy current separation, secondary magnetic separation or other downstream refinement processes.

Figure 2:
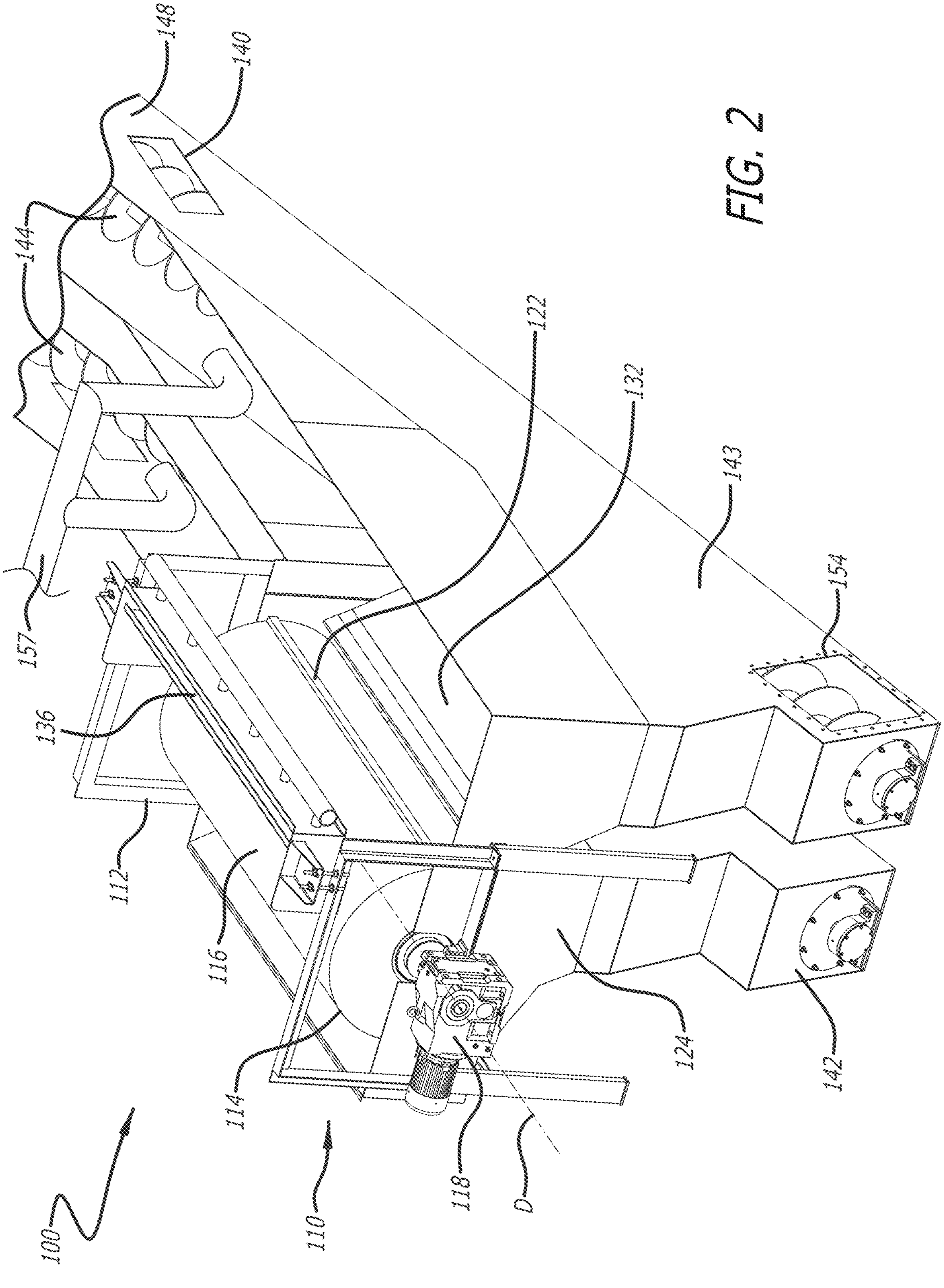
FIG. 2 is an enlarged front perspective view of the fluidic separation system in FIG. 1.

Referring now to FIG. 1 and FIG. 2 there is shown a perspective view of a fluidic separation system 100. The fluidic separation system 100 may be supported, suspended or floor-mounted in various installation configurations relative to an upstream shredder residue source, including positions below or adjacent to the source. As shown the fluidic separation system 100 is without external supports and without reference to any particular elevation. The fluidic separation system 100 has a magnetic separator 110 positioned above a magnetic chute 143 and a non-magnetic chute 142.

The magnetic separator 110 is supported by a frame 112 that maintains the relative positioning of a magnetic drum 114, a separator chamber 124 and a cascade trough 136. The magnetic drum 114 is rotatably supported by the frame 112 for rotation about a longitudinal drum axis D. The magnetic drum 114 has a central shaft (not shown) extending along the drum axis D, the shaft being supported at opposite ends by bearings or other rotary supports mounted to the frame 112. The drum 114 may be fixed to or rotatable with respect to the shaft and defines an outer cylindrical surface 116 configured to attract or retain magnetically responsive material during operation.

The drum 114 includes one or more of a flow inducer 122 disposed on the outer cylindrical surface 116. The flow inducer 122 is configured to engage shredder residue that may become lodged between the outer cylindrical surface 116 and the separator chamber 124 during operation. The rotation of the drum 114 and consequently the rotation of the flow inducer 122 assists in guiding such lodged shredder residue towards its respective designated flow path. The flow inducer 122 may be formed as a single, continuous member extending along a portion of the drum's 114 longitudinal length as shown. The flow inducer 122 is generally rectangular cross-sectional shape to facilitate uniform engagement with shredder residue but may take any suitable geometric form including but not limited to circular, trapezoidal, triangular, a curved, angled or otherwise contoured profile, as needed to optimize engagement or conform to with the outer cylindrical surface 116. The flow inducer 122 may also be formed by a plurality segments laterally spaced about the outer cylindrical surface 116 to form a cascading step-like arrangement. A segmented configuration of the flow inducer 122 permits staggered engagement with slurry causing a gradual clearing of shredder residue. The flow inducer 122 may be removably secured to the outer cylindrical surface 116 to facilitate replacement or adjustment, and may vary in height, thickness or circumferentially spaced about the drum 114 when two or more flow inducers 122 are present. Alternatively, the flow inducer 122 may be permanently fixed to the outer cylindrical surface 116 or formed as a single piece with the drum 114.

Figure 3:
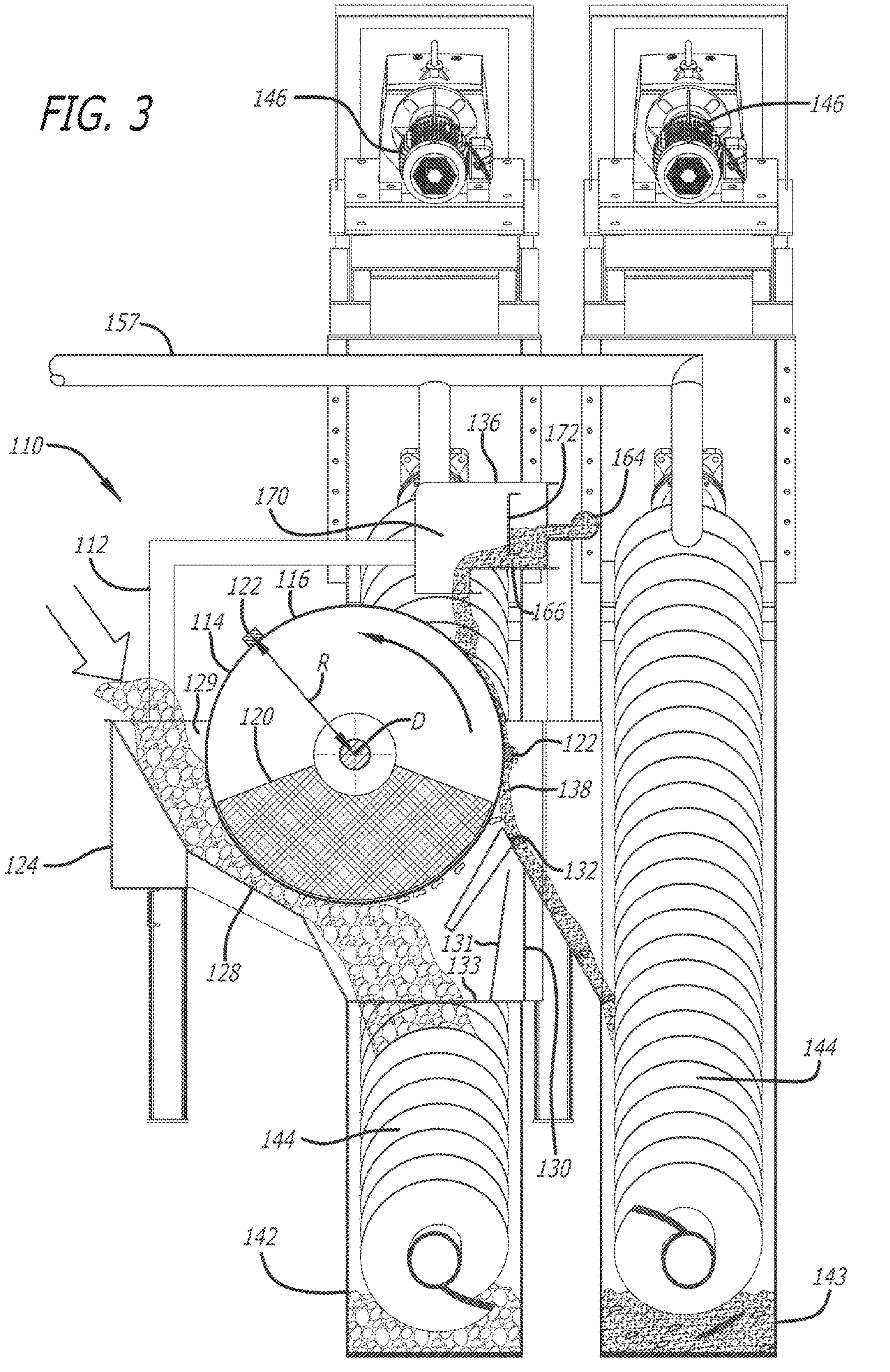
FIG. 3 is a cutaway front view of the fluidic separation system.
Figure 4:
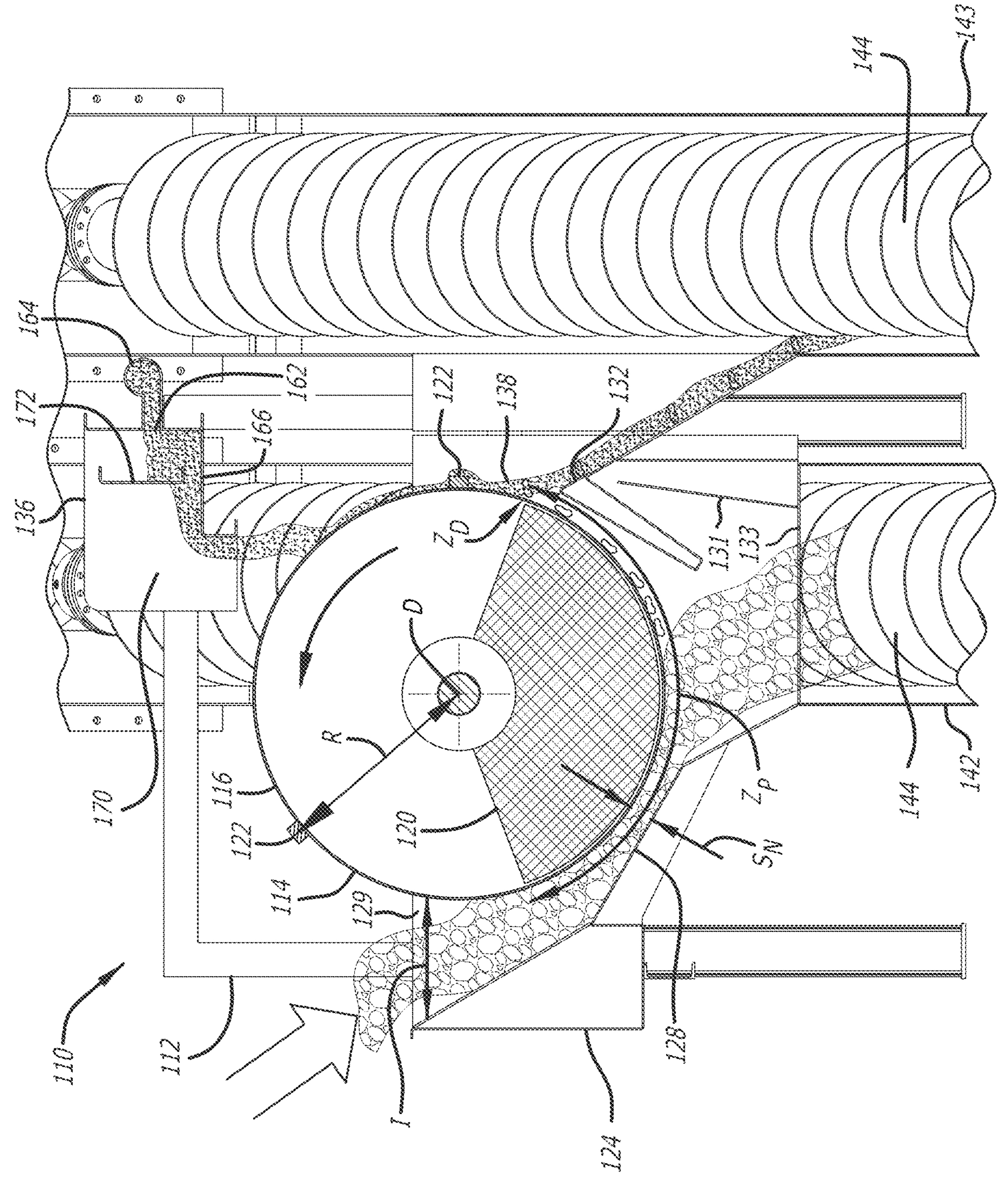
FIG. 4 is an enlarged cutaway front view of the fluidic separation system in FIG. 3.

Referring now to FIG. 3 and FIG. 4, a cutaway of the fluidic separation system 100 is shown. The drum 114 includes a magnetic assembly 120 disposed within the body of the drum 114 and is configured to generate a magnetic field that extends through the outer surface 116 of the drum to attract magnetically responsive material. The magnetic assembly may include one or more permanent magnets, electromagnets, or combinations thereof, and may be arranged as a stationary magnetic core relative to the body of the rotating drum 114 about the central axis D. The magnetic assembly 120 is maintained in an adjustably fixed angular position about the drum axis D, while the outer cylindrical surface 116 of the drum rotates relative to the magnetic assembly 120. As a result, the region of strongest magnetic influence along the outer cylindrical surface 116 is determined by the angular position and circumferential extent of the magnetic assembly 120. In this way, a magnetic pickup zone $Z_P$ and a magnetic discharge zone $Z_D$ may be selectively positioned at desired locations about the circumference of the drum 114. The magnetic pickup zone $Z_P$ corresponds to the circumferential span of the outer surface 116 that overlays the magnetic assembly 120 and is subjected to sufficient magnetic field strength to attract and retain magnetically responsive material on the outer surface 116 as the drum 114 rotates. Magnetically responsive material captured in the pickup zone $Z_P$ is transported about the rotating drum 114 across the circumferential extent of the magnetic assembly 120. The magnetic discharge zone $Z_D$ is located immediately downstream of, and adjacent to, a terminal end of the magnetic assembly 120 in the direction of drum 114 rotation, where the magnetic field strength decreases such that the magnetically responsive material is no longer retained on the outer surface 116 and is released therefrom. For example, when the drum 114 rotates in a counterclockwise direction, the magnetic pickup zone $Z_P$ begins at a leading circumferential edge of the magnetic assembly 120 (as encountered by the rotating outer surface 116), extends across the full circumferential span of the magnetic assembly 120, and terminates at a trailing circumferential edge of the magnetic assembly 120, which defines the beginning of the magnetic discharge zone $Z_D$.

Referring back to FIG. 1 and FIG. 2, rotation of the drum 114 may be produced by a drive system 118, which may include an electric motor, hydraulic motor or other rotary actuator coupled to the central shaft or body of the drum 114 through one or more of a gearbox, belt drive, chain drive or direct-drive coupling. In embodiments employing electromagnets, the magnetic field may be generated by an electrical power source, which may include a power supply, generator or battery system and associated control circuitry for selectively energizing the magnetic assembly 120.

The separator chamber 124 is positioned beneath and partially encloses the magnetic drum 114. The separator chamber 124 is configured to receive shredder residue and contain process fluid. The separator chamber 124 may have one or more process fluid inlets (not shown) for introducing the process fluid into the separation system 100 and may also be introduced via the cascade trough 136 or a skimmer 157 as will be discussed. When the shredder residue is introduced into the separator chamber 124, interaction with the process fluid contained therein causes stratification of the shredder residue to disperse and break apart into more freely moving individual particles. This dispersion reduces cohesion between particles and allows magnetically and non-magnetically responsive materials to separate more readily. As a result, magnetically responsive materials are more effectively exposed to the magnetic field of the drum 114, while non-magnetically responsive materials are more readily transported by hydraulic flow, density or a combination thereof, away from the magnetic field of the drum thereby enhancing separation efficiency and promoting refinement of the shredder residue.

As shown in FIG. 3 and FIG. 4, the separator chamber 124 includes a floor 128, a set of opposing side walls 129, and a back wall 130 that cooperate to define the volume of the separator chamber 124. The floor 128, side walls 129, and back wall 130 may be planar, curved, or otherwise contoured, and may include alternative shapes and arrangements as necessary to accommodate different flow patterns, processing volumes, or chamber geometries. A portion of the magnetic drum 114 may be positioned within the volume of the separator chamber 124, or the magnetic drum 114 may be fully enclosed within the separator chamber 124 volume. The separator chamber 124 includes an inlet I defined by the special gap between the upper extremity of floor 128 and the drum 114.

From the inlet I, the floor 128 extends downward from the upper extremity of the side walls 129 toward a discharge opening 133 formed at the bottom of the chamber 124. The discharge opening 133 extends from the floor 128 to the back wall 130. The discharge opening 133 is in fluid communication with a non-magnetic chute 142 such that non-magnetic fraction and process fluid are directed into the chute 142. Downstream of the inlet I, a narrower spatial gap $S_N$ is maintained between the floor 128 and the outer cylindrical surface 116. The spatial gap $S_N$ is substantially smaller than the spatial gap defining the inlet I such that the shredder residue is funneled downward toward the discharge opening 133. In this way, the change in spatial availability promotes mixing and stratification of the shredder residue with the process fluid, facilitating separation of magnetically and non-magnetically responsive material, while allowing the magnetic field of the drum 114 to attract magnetically responsive particles. The spatial gap $S_N$ is selected based on the radial distance R taken from the central axis D to the distal end of the flow inducer 122, such that the floor 128 is spaced from the flow inducer 122 by a clearance sufficient to prevent interference while maintaining a restricted flow passage for the shredder residue.

The floor 128 is sloped downward to guide non-magnetically responsive material toward the discharge opening 133. As the shredder residue passes under the magnetic pick up zone $Z_P$ non-magnetically and magnetically responsive separate causing sedimentation of non-magnetically responsive material towards the discharge opening 133 while the magnetically responsive material is transported to the discharge zone $Z_D$. The floor 128 has a finished surface with a low surface roughness selected to reduce friction and inhibit adhesion or snagging of particulate material, thereby reducing material buildup. This in combination with the flow inducer 122, promote continuous flow of shredder residue. The floor 128 may be treated to have a substantially continuous surface profile free of micro-scale surface discontinuities that could catch fine or fibrous material, thereby reducing accumulation and promoting self-cleaning flow behavior. The flow 128 may also include polymer liners, finishes, coatings, or other low-friction, wear-resistant material.

The separator chamber 124 has a magnetic discharge ramp 132 disposed between the opposing side walls 129 of the chamber 124 and intersects the back wall 130. The ramp 132 has a peaked profile configured to direct magnetically responsive material toward the magnetic chute 143. The ramp 132 may be angled, contoured, or otherwise shaped to optimize material flow. The ramp 132 may be integrated with or separate from the separator chamber 124, and may include alternative configurations to accommodate different drum 114 sizes, magnetic field strengths, or material flow characteristics. As magnetic fraction is discharged from the drum 114 from at the discharge zone $Z_D$, the magnetic fraction is caught and guided downward into the chute 143 by the ramp 132.

The separator chamber 124 also has a splitter wall 131 disposed between the side walls 129 is positioned beneath the ramp 132 and is spatially adjacent to the back wall 130 to define an overflow path for process fluid and residual shredder residue therein. The splitter wall 131 extends downward to the discharge opening 133. The overflow path is configured to establish and maintain a minimum process fluid level within the separator chamber 124. The overflow path permits excess process fluid and buoyant or low-density particulate material to exit via the discharge opening 133. In this way, the overflow path prevents overfilling, and facilitates removal of floating debris for further processing or disposal.

Figure 5:
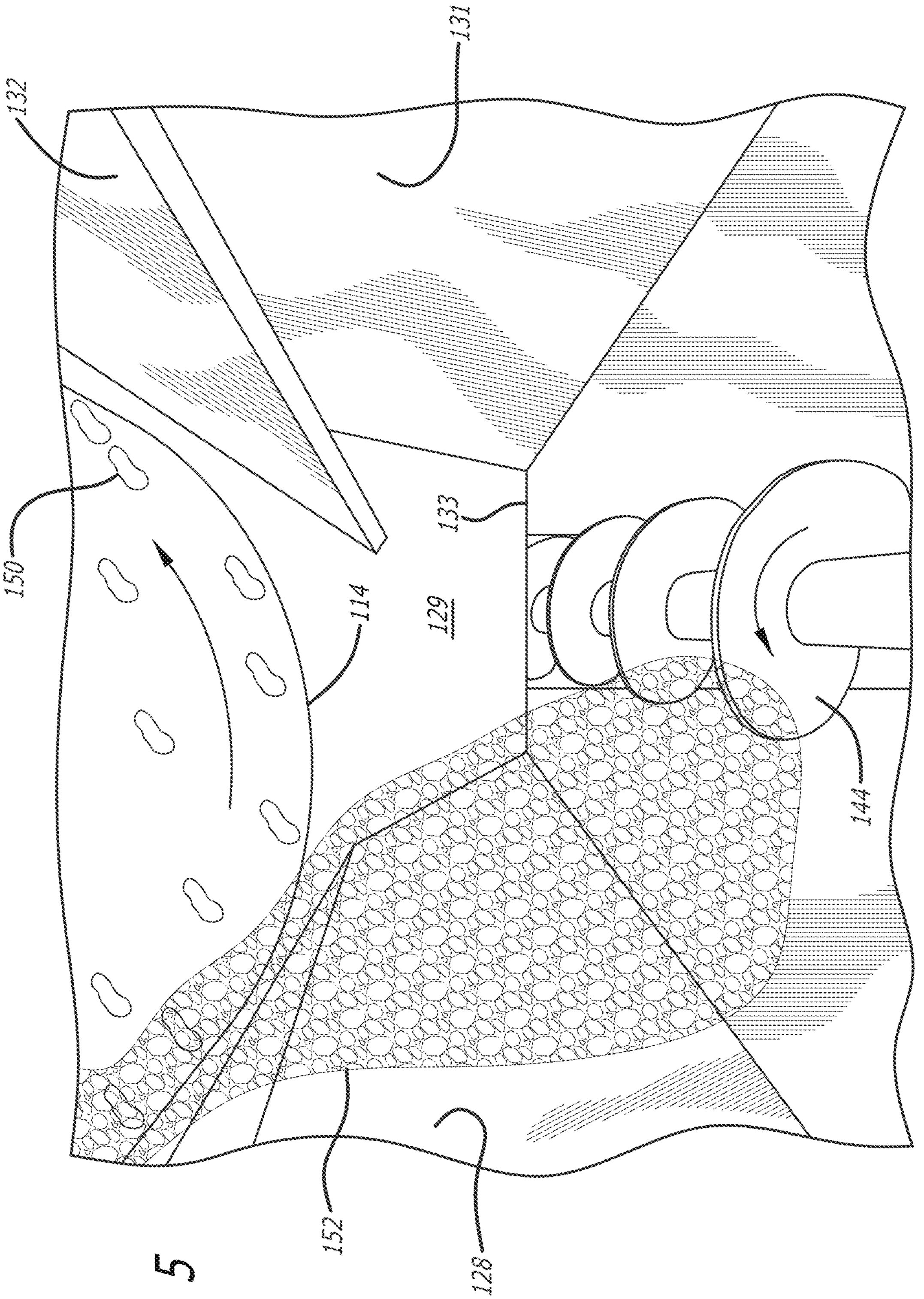
FIG. 5 is an enlarged view of a separator chamber.

The geometry and surface finish of the floor 128 and directive structuring with the drum 114 minimize material-retention zones, reduce abrasive contact points and promote continuous self-clearing material flow while also enabling controlled hydraulic conditions that support downstream refinement of both magnetic and non-magnetic fractions. As shown in FIG. 5, non-magnetic fraction 152 falls beneath the drum 114 through the discharge opening 133 into the non-magnetic chute 142 housing an auger 144 therein. While non-magnetic fraction 152 is conveyed through the discharge opening 133, magnetic fraction 150 is attracted to and carried by magnetic field of the drum 114 to the discharge zone (not shown) wherein the magnetic fraction 150 separates from the drum 114 onto the ramp 132 and into the magnetic chute 143 (not shown). The non-magnetic fraction 152 may also contain magnetically responsive particles that are not fully separated during an initial pass through the separation system 100. Such particles may remain influenced by the magnetic field emitted by the drum 114 and, under certain flow conditions, may be carried along the overflow path defined by the splitter 131 and down toward the magnetic discharge opening 133. See also FIG. 3. The non-magnetic fraction 152 may be recirculated through the fluidic separation system 100 after an initial separation pass in order to recover magnetically responsive material that was not previously captured.

Figure 6:
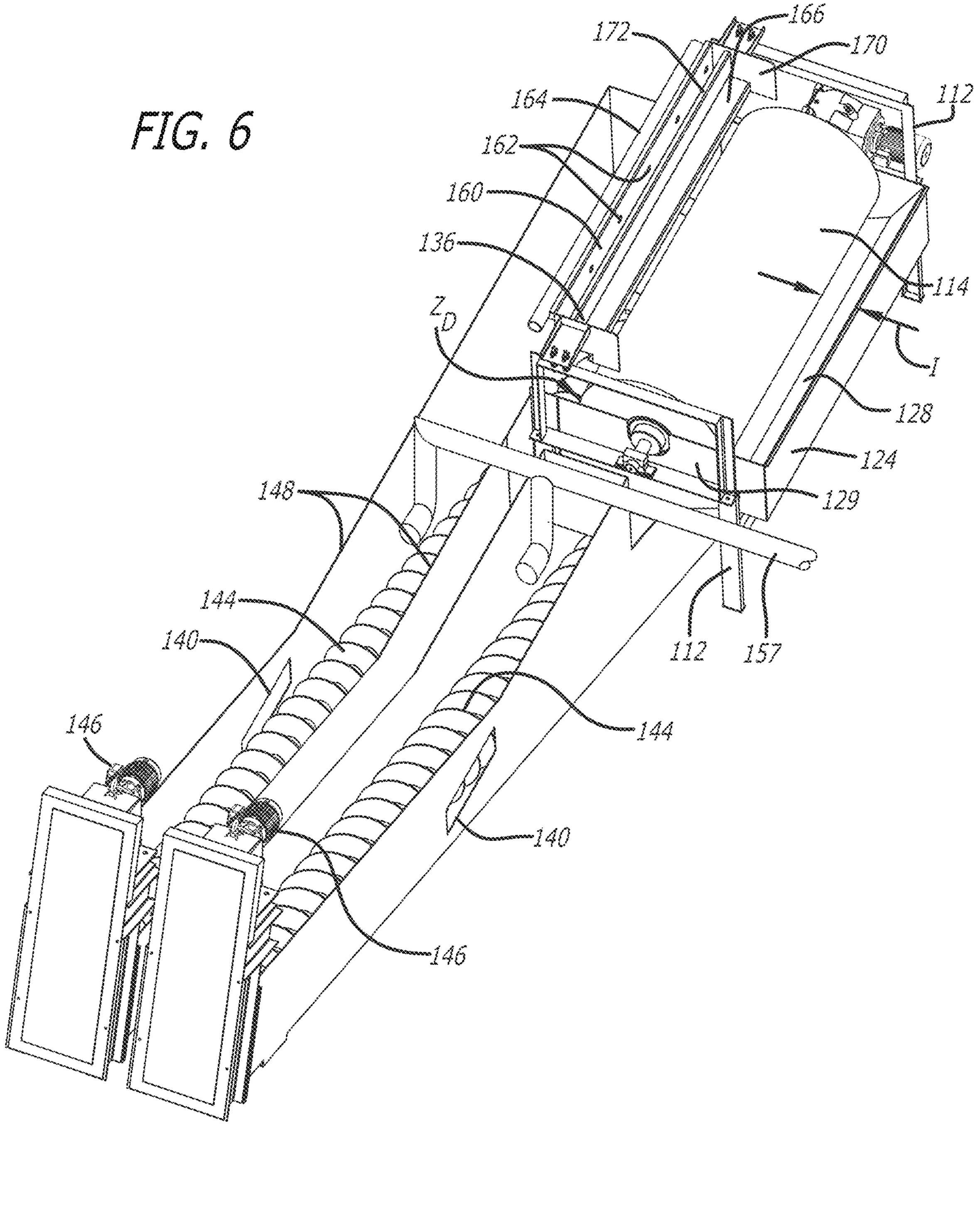
FIG. 6 is an enlarged back side view of the fluidic separation system.

Referring now to FIG. 6, a back perspective view of the separation system 100 is shown. The cascade trough 136 is supported by the frame 112 and suspended above the magnetic drum 114 respective to the discharge zone $Z_D$. The cascade trough 136 is disposed along the longitudinal length of the drum 114. The cascade trough 136 may include an inlet wall 160 having a plurality of inlet ports 162 fluidically coupled to an inlet pipe 164. The inlet wall 160 is connected to a lower fluid runner 166 that is substantially planar and extends outwardly from the inlet wall 160. The inlet wall 160 and the fluid runner 166 may be disposed between opposing splash panels 170 that define lateral boundaries for the flow of process fluid. The splash panels 170 may extend beyond and downwardly below the fluid runner 166 to guide the process fluid toward the outer cylindrical surface 116 of the drum 114. See also FIG. 3 and FIG. 4.

The cascade trough 136 further includes a fluid breaker 172 opposing the inlet ports 162 to disrupt the velocity and momentum of process fluid entering through the inlet ports 162 to promote the formation of a substantially uniform, laminar flow of process fluid that travels along the fluid runner 166. In alternative embodiments, the fluid runner 166 may be angled, curved, contoured or otherwise shaped to condition the fluid flow and distribute the process fluid across the length of the drum 114 without the need for the fluid breaker 172. The cascade trough 136 may be oriented horizontally, downwardly angled or otherwise inclined relative to the drum to control the point and manner in which process fluid is discharged onto the drum 114.

Referring back to FIG. 4, the cascade trough 136 is configured to discharge process fluid 138 in the form of a distributed curtain, sheet or cascade over the outer cylindrical surface 116 of the drum 114. The resulting fluid flow across the outer cylindrical surface 116 generates a shear force acting on magnetic material retained on the drum 114 by magnetic attraction which assists in dislodging and urging magnetically responsive material away from the surface 116 and toward the magnetic chute 143. In this way, the applied processing fluid 138 promotes release of captured material and directs the released material along a controlled trajectory.

The magnetic chute 143 and the non-magnetic chute 142 are substantially mirror images of one another and/or substantially identical in structure and function, differing primarily in their respective positions relative to the receipt of magnetic and non-magnetic fractions. Accordingly, the following description is with respect to the magnetic chute 143, and corresponding reference numerals may apply equally to the non-magnetic chute 142.

Figure 7:
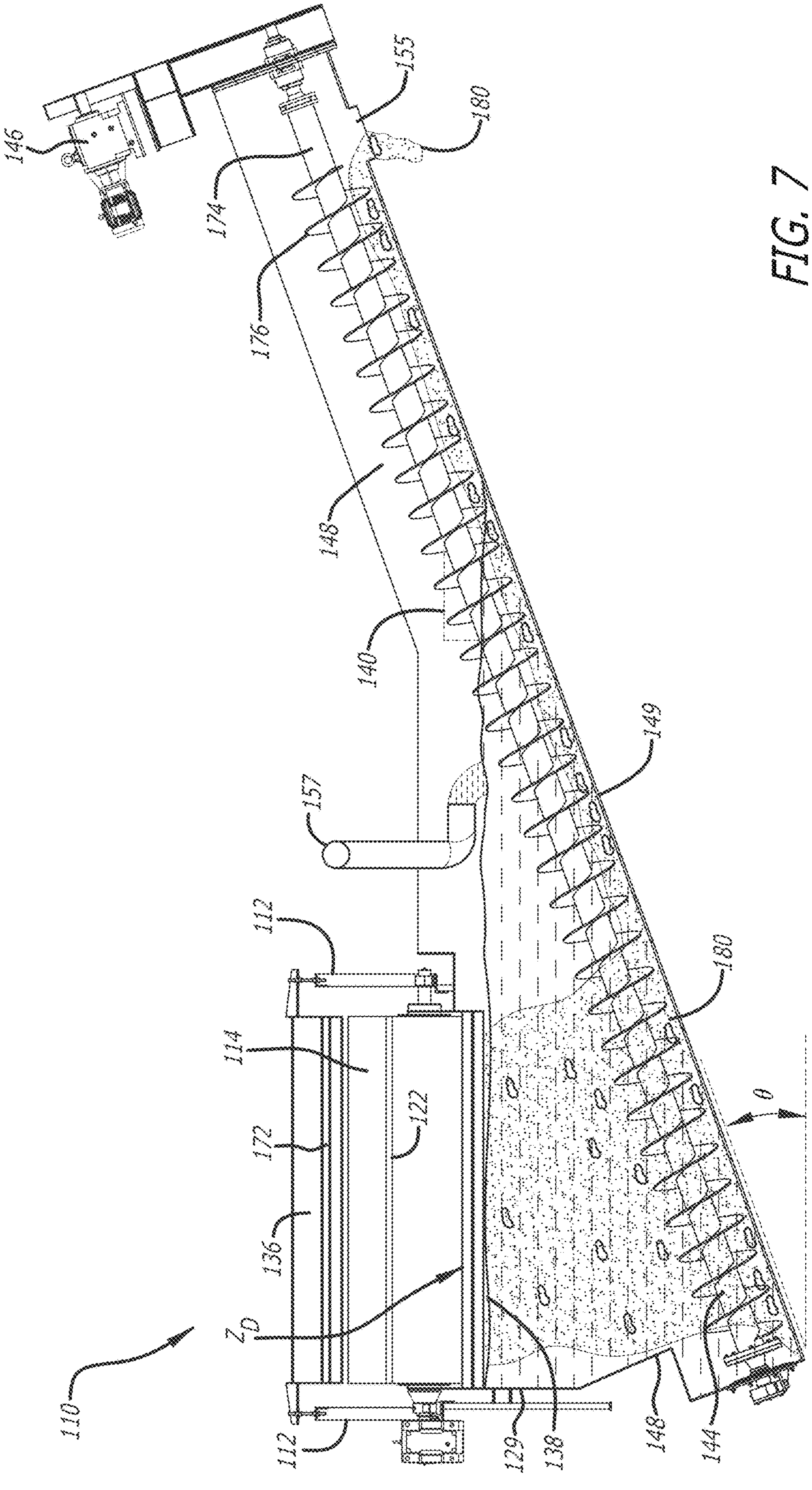
FIG. 7 a cutaway side view of the fluidic separation system.

As shown in FIG. 6 and FIG. 7, the chute 143 has opposing chute side walls 148 extending outwardly downward from the magnetic separator 110 to a bottom wall 149 cooperating with the side walls 148 to define a generally square cross-sectional shape. In alternative embodiments, the chute 143 may define tubular, semi-cylindrical, U-shaped, V-shaped, triangular, trapezoidal or other cross-sectional profiles configured to receive discharged fraction and to accommodate the auger, drag element or fluid flow, for conveying discharged material away from the magnetic separator 110. The selected chute 143 geometry may be determined based on factors including shredder residue characteristics, desired throughput, manufacturing considerations and maintenance requirements.

The chute walls 148 may extend from the side walls 129 and floor 128 and/or extend from the frame 112 of the magnetic separator 110. The chute walls 148 and bottom wall 149 may be formed as planar panels joined along longitudinal edges, and extend along the chute length to confine respectively discharged fraction. The chute 143 is inclined upwardly from a proximal end adjacent to the discharge zone $Z_D$ toward an opposing distal end at an inclination angle θ relative to the horizontal plane. The chute walls 148 are configured to extend from the magnetic separator 110 to maintain the inclination angle θ along the length of the chute 143. The inclined configuration is provided, at least in part, to maintain the minimum level of process fluid 138 within the chute 143 that is shared with and in fluid communication with the separator chamber 124. The inclination of the chute 143 further results in at least a portion of the chute, such as approximately one-third or more of the chute 143 length, being positioned above the maintained process fluid 138 level and exposed to the atmosphere, thereby permitting drainage, aeration and partial drying of the conveyed material as it progresses toward an outlet 155.

The chute 143 includes the auger 144 disposed within the chute 143 and extending along the chute 143 length. The auger 144 is be rotatably supported on opposing ends of the chute 143 by bearings or other rotary supports and driven by an auger drive system 146. The drive system 146 may be driven at constant or variable rotational speeds and may be characterized as an electric motor, hydraulic motor or other rotary actuator. The auger 144 has an elongate central shaft 174 and one or more helical flighting elements 176 extending radially outward from the shaft 174. The elongate shaft 174 is coupled to the drive system 146 for rotational movement through one or more of a gearbox, belt drive, chain drive or direct-drive coupling. The central shaft 174 may have a diameter between eight (8) to twelve (12) inches. The helical flighting 176 may be formed as a continuous helical flight, segmented flights, paddles, ribbons or combinations thereof, arranged to urge fraction axially along the auger 144 when the auger 144 is rotated and through the outlet 155 into downstream processing equipment, or collection bins (not shown).

As the magnetic separator 110 discharges respective fraction into the chute 143, accumulated fraction 180 is caused by the density of the fraction that causes it to settle beneath the auger 144 and accumulate along the bottom wall 149. The sizing and geometry of the chute 143 provide a clearance between the outer diameter of the helical flighting 176 and the inner surfaces of the chute walls 148 and bottom wall 149, the clearance being between about 1 and about 3 inches. This clearance, in combination with the generally square cross-sectional profile of the chute 143 promotes the accumulation of discharged fraction 180 along the bottom wall 149, thereby mitigating the occurrence of slippage and facilitating consistent and controlled engagement of the fraction with the auger 144 for downstream conveyance. Slippage is defined as relative motion between the conveyed fraction and the helical flighting resulting in reduced axial transport efficiency. Further, the accumulation of the fraction 180 along the auger 144 provides structural support for the auger 144.

Augers spanning a length of ten feet or more may require intermediary support structures called hanger supports. In wet, abrasive or heavy material environments the related material can cause the commercially available auger to bear increased bending load and therefore require intermediary support. Because of the accumulation of fraction caused by the geometric cross section and clearance provided between the auger 144 and the chute 143, intermediary support may be unneeded. The accumulation of fraction 180 acting as consistent structural support along the span of the auger 144. This in turn allows for extending the auger 144 length beyond commercial availability. The augers may be configured to have a standardized nominal outer diameter of about 24 inches and a central tube defining an internal diameter greater than a standard internal diameter associated with 24-inch auger flighting to aid in rigidity and support the omission of intermediary supports. Referring back to FIG. 1 and FIG. 2, the chute walls 148 may include one or more viewing window 154 located along the span of the chute 143. The viewing window 154 permits the operator to monitor the accumulation of discharged fraction to ensure there is a consistent bed of material from which the auger 144 is provided support. The window 154 may be formed of acrylic or other transport fraction that is capable of withstanding the abrasiveness of the discharged material while maintaining structural support to the chute walls 148.

The separation system 100 further includes a fluid skimmer 157 positioned above the chute 143 and extending downward but remaining above the maintained process fluid 138 level within. The fluid skimmer 157 may comprise one or more manifolds, nozzles or pipes configured to dispense process fluid across or along the upper surface of the maintained process fluid level thereby generating a surface flow that urges floating waste materials, light fractions or fines and entrained debris toward one or more exit weir 140. The position, height and geometry of the exit weir 140 is selected to define the process fluid level 138 setpoint between the separator chamber 124 and the chute 143 and to control hydraulic residence time, surface flow velocity and discharge characteristics. The exit weir 140 is defined by an opening in the chute wall 148 and may have a rectangular geometric shape or other geometric shape to maintain the process fluid level 138 and removal of floating debris. The exit weir 140 is located on one side of the chute 143 and opposite the side of fraction conveyance defined by the auger 144 thereby allowing surface fluid and floating debris to exit without interfering with conveyed fraction. For example, as accumulated fraction is moved from the proximal end of the chute 143 by the rotation of the auger 144, the material is maintained on the bottom of the auger 144 and is conveyed on one side by the flights 176. The side from which material is conveyed is dependent on the pitch and positioning of the helical flights 176 and rotation of the auger 144. In positioning the exit weir 140 opposite the side of the conveyed material, this ensures that desired fraction does not get removed via the exit weir 140 and is conveyed toward the outlet 155. Further, as the fraction is conveyed beyond the location of the exit weir 140, and thereby above the maintained process fluid 138 level, the conveyed fraction is exposed to the atmosphere, thereby permitting drainage, aeration and partial drying of the conveyed fraction as it progresses toward the outlet 155. In this way, the overall weight of the discharged fraction is reduced upon exiting the separation system 100. Reducing the moisture content of the fraction, in particular waste material set out for disposal, can reduce the overall weight which in turn reduces the cost impact as available disposal systems charge by weight.

Structural components of the fluidic separation system 100 including but not limited to the drum 114, separator chamber 124, chute 143, cascade trough 136, frame 112 and other components described herein may be formed from metals, alloys, polymers, composites or combinations thereof selected to provide adequate mechanical strength, corrosion resistance and compatibility with wet or abrasive processing environments. In wet separation applications, components exposed to shredder residue may be formed from or coated with corrosion-resistant materials such as stainless steel, polymeric coatings, rubber linings and ceramic coatings. Material selections may be varied according to operating conditions, including magnetic field requirements, temperature, chemical exposure, abrasion and throughput.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A fluidic separation system for separating magnetically responsive and non-magnetically responsive material from shredder residue comprising:

a frame;

a magnetic drum rotatably supported by the frame, the drum having an outer peripheral surface and is configured to generate a magnetic field adjacent to the outer peripheral surface, the magnetic field configured to attract and retain magnetically responsive material from the shredder residue on the outer peripheral surface to transport the magnetically responsive material along a circumferential path and discharge the magnetically responsive material into a first chute positioned adjacently below the magnetic drum, and at least one flow inducer disposed along the outer peripheral surface spanning at least a portion of a length thereof;

a separator chamber supported by the frame and positioned below the magnetic drum, the separator chamber configured to receive shredder residue and combine it with a process fluid contained therein, the separator chamber is defined by a set of side walls, a back wall and a floor configured to direct non-magnetically responsive material toward a second chute positioned beneath the separator chamber; and a cascade trough supported by the frame and positioned above the magnetic drum relative to where the magnetically responsive material discharges into the first chute and disposed along the length of the magnetic drum, the cascade trough configured to discharge process fluid in a sheet over the outer peripheral surface to generate a shear effect urging retained magnetically responsive material away from the drum toward the first chute;

wherein the first chute is defined by a first set of opposing outer walls that extend from the side walls and are disposed between a first bottom wall, the first set of outer walls having a first at least one exit weir, the first chute configured to receive magnetically responsive material via a discharge ramp, the first chute having a first auger rotatably disposed within the first chute, the first auger defined by a first shaft and a first helical flight that extends along the first shaft and are configured to convey magnetically responsive material toward a first outlet located at a first distal end of the first chute;

wherein the second chute is defined by a second set of opposing outer walls that extend from the side walls and the floor and are disposed between a second bottom wall, the second set of outer walls having a second at least one exit weir, the second chute having a second auger rotatably disposed within the second chute the second auger defined by a second shaft and a second helical flight that extends along the second shaft and are and configured to convey non-magnetically responsive material toward a second outlet located at a second distal end of the second chute;

wherein the first and second at least one exit weirs are positioned to maintain a minimum process fluid level of the first and second chutes and permits floating waste material to exit the first and second chute;

wherein the at least one flow inducer is configured to urge lodged shredder residue between the drum and the floor toward the first and second chute.

2. The fluidic separation system of claim 1 wherein the first and second at least one exit weirs are disposed laterally opposite the side along which material moves about the first and second augers.

3. The fluidic separation system of claim 1 wherein neither the first and second augers have sectional supports, both the first and second augers are supported by a bed of accumulated discharged material.

4. The fluidic separation system of claim 1 wherein the first and second distal ends are vertically higher than the minimum process fluid level such that at least one third of the length of the of the first and second augers and first and second chutes are exposed to the atmosphere.

5. The fluidic separation system of claim 1 wherein the first and second chutes have a viewing window located at a first and second proximal end, the first and second proximal ends being laterally opposite the first and second distal ends.

6. The fluidic separation system of claim 1 wherein the first and second chutes further comprise a skimmer positioned above the minimum process fluid level and is configured to dispense process fluid across the top of the maintained process fluid level within the first and second chutes for urging floating waste materials out of the first and second exit weirs.

7. The fluidic separation system of claim 1 wherein the surface of the floor includes a polished finish, coating, or liner configured to reduce friction and inhibit accumulation of material.

8. The fluidic separation system of claim 1 wherein the first and second chutes generally have a square cross section.

9. The fluidic separation system of claim 1 wherein a clearance between the first and second helical flights and the inner surface of the first and second set of opposing outer walls and first and second bottom walls is between 1 and 3 inches.

10. The fluidic separation system of claim 1 wherein the shredder residue comprises material having a maximum dimension of ¾".

11. A fluidic separation system for separating magnetically responsive material from shredder residue comprising:

a frame;

a magnetic drum rotatably supported by the frame and defining an outer peripheral surface, the magnetic drum configured to generate a magnetic field adjacent to the outer peripheral surface for attracting and retaining magnetically responsive material from the shredder residue about a circumferential path to then discharge the magnetically responsive material into a first chute positioned adjacently below the drum and separated by a discharge ramp, and at least one flow assist member disposed along the outer peripheral surface;

a separator chamber supported by the frame and positioned below the magnetic drum, the separator chamber configured to receive shredder residue and mix with a process fluid contained therein to support stratification of the shredder residue, the separator chamber defined by opposing side walls, a back wall, and a floor configured to direct non-magnetically responsive material away from the drum and toward a second chute positioned below and in fluid communication with the separator chamber; and a cascade trough supported by the frame positioned above the drum disposed along the length of the drum and configured to discharge fluid in a sheet over the outer peripheral surface to generate a shear effect urging material away from the drum and into the first chute;

wherein the first and second chutes each have a proximal end and a distal end, the distal ends are positioned vertically higher than proximal ends, and the first and second chutes defined by two outer walls disposed between a bottom wall, the outer walls extending from the separator chamber and enclose a screw conveyer each rotatably supported within the first and second chutes configured to convey respective magnetically and non-magnetically responsive material toward a waste port located at the distal end, and have at least one exit weir deposed along one of the outer walls;

wherein the first and second chutes are configured to accumulate material along the bottom walls to be conveyed by a helical flight member extending laterally from a shaft of the screw conveyer on one side of the screw conveyer toward the waste port.

12. The fluidic separation system of claim 11 wherein the at least one exit weirs of the first and second chutes are disposed laterally opposite the side along which material moves about the screw conveyors.

13. The fluidic separation system of claim 11 wherein neither the screw conveyors of the first and second chutes have sectional supports, and are supported by the accumulated material.

14. The fluidic separation system of claim 11 wherein the outer walls of the first and second chutes have a viewing window.

15. The fluidic separation system of claim 11 wherein the first and second chutes further comprise a skimmer positioned above the minimum process fluid level of the chutes, the skimmer configured to dispense process fluid across the top of the maintained process fluid level for urging floating waste materials out of the exit weirs.

16. The fluidic separation system of claim 11 wherein the surface of the floor includes a polished finish, coating, or liner configured to reduce friction and inhibit accumulation of material.

17. The fluidic separation system of claim 11 wherein the first and second chutes generally have a square cross section.

18. The fluidic separation system of claim 11 wherein a clearance between the helical flights of the screw conveyers of the first and second chutes and the inner surface of the outer walls and bottom wall is between 1 and 3 inches.

* * * * *